US012786692B2

(12) United States Patent
Hong

(10) Patent No.: US 12,786,692 B2
(45) Date of Patent: Nov. 3, 2026

(54) CAPABILITY INDICATION METHOD AND APPARATUS, CAPABILITY DETERMINATION METHOD AND APPARATUS, COMMUNICATION APPARATUS AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 310 days.

(21) Appl. No.: 18/689,382

(22) PCT Filed: Sep. 7, 2021

(86) PCT No.: PCT/CN2021/117044
§ 371 (c)(1),
(2) Date: Mar. 5, 2024

(87) PCT Pub. No.: WO2023/035122
PCT Pub. Date: Mar. 16, 2023

(65) Prior Publication Data
US 2024/0406712 A1 Dec. 5, 2024

(51) Int. Cl.
*H04W 12/45* (2021.01)
*H04W 8/22* (2009.01)
(Continued)

(52) U.S. Cl.
CPC ............. *H04W 8/22* (2013.01); *H04W 24/02* (2013.01); *H04W 36/0055* (2013.01); *H04W 88/06* (2013.01)

(58) Field of Classification Search
CPC ......... H04W 8/183; H04W 8/22; H04W 8/24; H04W 12/00403; H04W 12/42; H04W 12/43; H04W 12/45; H04W 24/02; H04W 36/0055; H04W 88/06; H04W 36/00; H04W 76/19; H04W 60/005; H04W 92/08
See application file for complete search history.

(56) References Cited

U.S. PATENT DOCUMENTS

2017/0156050 A1* 6/2017 Khairmode ........... H04W 76/18
2023/0047213 A1* 2/2023 Chen ................. H04W 36/0022

FOREIGN PATENT DOCUMENTS

CN 110932830 A 3/2020
CN 112136340 A 12/2020
(Continued)

OTHER PUBLICATIONS

Apple Inc, MUSIM Network Switching, 3GPP TSG-RAN WG2 Meeting # 115 Electronic, 7 pages, Aug. 9 to Aug. 28, 2021.*
(Continued)

*Primary Examiner* — Frank Duong
(74) *Attorney, Agent, or Firm* — Volpe Koenig

(57) ABSTRACT

Methods, apparatuses, and storage media for improving support for multiple subscriber identity module (multi-SIM) terminals in a wireless communication network. Support for the multi-SIM terminals is improved by: sending capability indication information to a network side device, where the capability indication information is used for indicating whether the terminal is capable of performing multi-SIM connection switching.

17 Claims, 5 Drawing Sheets

(51) Int. Cl.

| | |
|---|---|
| ***H04W 24/02*** | (2009.01) |
| ***H04W 36/00*** | (2009.01) |
| *H04W 88/06* | (2009.01) |

(56) References Cited

FOREIGN PATENT DOCUMENTS

| | | | |
|---|---|---|---|
| CN | 112770316 | A | 5/2021 |
| CN | 113259925 | A | 8/2021 |
| WO | 2021147958 | A1 | 7/2021 |

OTHER PUBLICATIONS

ISA State Intellectual Property Office of the People's Republic of China, International Search Report Issued in Application No. PCT/CN2021/117044, May 26, 2022, WIPO, 4 pages.

State Intellectual Property Office of the People's Republic of China, Office Action and Search Report Issued in Application No. 2021800028753, Aug. 1, 2025, 15 pages. (Submitted with English Translation).

OPPO, "UE Notification on Network Switching for Multi-SIM", R2-2104765, 3GPP TSG-RAN W62 Meeting #114 electronic, Online, May, 2021, 4 pages.

Samsung, "Summary of AI 8.3.3: UE notification on network switching for multi-SIM", R2-2104319, 3GPP TSG-RAN WG2 Meeting #113bis-e, Online, Apr. 12-Apr. 20, 2021, 14 pages.

Apple Inc, "MUSIM_Network_Switching", R2-2103831, 3GPP TSG-RAN WG2 Meeting # 113 bis Electronic, Online, Apr. 12-Apr. 20, 2021, 7 pages.

Vivo, "Status report for WI Core part: Support for Multi-SIM devices for LTE/NR", RP-212027, 3GPP TSG RAN meeting #93e, Electronic Meeting, Sep 13-17, 2021, 7 pages.

ISA State Intellectual Property Office of the People's Republic of China, Written Opinion of the International Searching Authority Issued in Application No. PCT/CN2021/117044, May 26, 2022, WIPO, 7 pages.

* cited by examiner

CAPABILITY INDICATION METHOD AND APPARATUS, CAPABILITY DETERMINATION METHOD AND APPARATUS, COMMUNICATION APPARATUS AND STORAGE MEDIUM

CROSS-REFERENCE TO RELATED APPLICATION

The present application is a U.S. National Stage of International Application No. PCT/CN2021/117044, filed on Sep. 7, 2021, the contents of which are incorporated herein by reference in their entirety.

TECHNICAL FIELD

The present disclosure relates to the field of communication technologies, and in particular, to capability indication methods, capability determination methods, capability indication apparatuses, capability determination apparatuses, communication apparatuses, and computer-readable storage media.

BACKGROUND

In a multiple subscriber identity module (multi-SIM) terminal, a plurality of subscriber identity modules (SIMs) can be set up, and the terminal can communicate via the plurality of SIMs. For example, SIM #1 and SIM #2 are set up in the terminal, and the terminal can use SIM #1 to perform communication operations or SIM #2 to perform communication operations.

However, in some scenarios, there may be a situation where the terminal needs to use SIM #2 for communication when it is using SIM #1 for communication, which requires the terminal to perform multi-SIM connection switching, e.g., switching from using SIM #1 for communication to using SIM #2 for communication. However, the capabilities of different terminals are different, and if all terminals are set to support multi-SIM connection switching by default, it may lead to problems when a base station makes configuration for those terminals that do not support multi-SIM connection switching.

SUMMARY

In view of this, embodiments of the present disclosure propose capability indication methods, capability determination methods, capability indication apparatuses, capability determination apparatuses, communication apparatuses and computer-readable storage media to solve technical problems in related technologies.

According to a first aspect of an embodiment of the present disclosure, a capability indication method is provided, which is performed by a terminal, and the method includes: sending capability indication information to a network side device, where the capability indication information is used for indicating whether the terminal is capable of performing multi-SIM connection switching.

According to a second aspect of an embodiment of the present disclosure, a capability determination method is provided, which is performed by a network side device, and the method includes: receiving capability indication information sent by a terminal; and determining whether the terminal is capable of performing multi-SIM connection switching according to the capability indication information.

According to a third aspect of an embodiment of the present disclosure, a capability indication apparatus is provided, including one or more processors, the one or more processors being configured to perform: sending capability indication information to a network side device, where the capability indication information is used for indicating whether the terminal is capable of performing multi-SIM connection switching.

BRIEF DESCRIPTION OF DRAWINGS

In order to more clearly illustrate technical solutions in embodiments of the present disclosure, a brief introduction will be given below to the accompanying drawings required in the description of the embodiments. It is evident that the accompanying drawings in the following description are only some embodiments of the present disclosure. For those of ordinary skill in the art, other accompanying drawings can be obtained based on these accompanying drawings without paying creative labor.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, not the whole of the embodiments. Based on the embodiments in the present disclosure, all other embodiments obtained by those of ordinary skill in the art without making creative efforts belong to the protection scope of the present disclosure.

Terms used in embodiments of the present disclosure are only for a purpose of describing specific embodiments, and are not limiting the embodiments of the present disclosure. Singular forms of "a," said," and "the" used in the embodiments of the present disclosure and in the claims are also intended to include majority forms, unless the context clearly indicates otherwise. It should also be understood that the term "and/or" as used herein refers to any or all of the possible combinations containing one or more of the listed items in association.

It should be understood that although terms first, second, third, etc., may be used to describe various information in the embodiments of the present disclosure, this information should not be limited to these terms. These terms are used only to distinguish the same type of information from one another. For example, without departing from the scope of the present disclosure, first information can also be called second information, and similarly, the second information can also be called the first information. Depending on the context, the word "if" as used herein can be interpreted as "at" or "when" or "in response to determining".

For the purpose of simplicity and ease of understanding, the terms used in the present disclosure to represent size relationships are "greater than," "less than," "higher than," or "lower than." But for those skilled in the art, it can be understood that the term "greater than" also covers the meaning of "greater than or equal to" and "less than" also covers the meaning of "less than or equal to." The term "higher than" covers the meaning of "higher than or equal to" and "lower than" also covers the meaning of "lower than or equal to."

Figure 1:
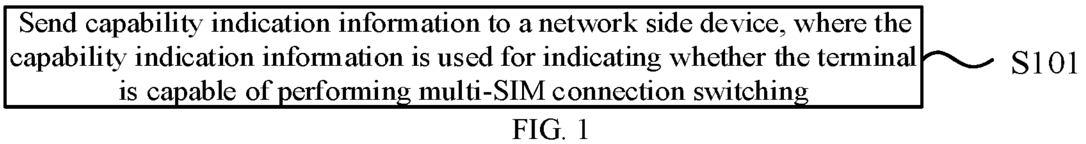
FIG. 1 is a schematic flowchart of a capability indication method illustrated according to an embodiment of the present disclosure.

FIG. 1 is a schematic flowchart of a capability indication method illustrated according to an embodiment of the present disclosure. The capability indication method shown in this embodiment can be performed by a terminal, including but not limited to a communication apparatus such as a cell phone, a tablet computer, a wearable device, a sensor, an IoT device, and the like. The terminal can be used as user equipment to communicate with a network side device, including but is not limited to a network side device in a communication system such as 4G, 5G, 6G, etc., and the network side device may be a base station, a core network, and the like.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs includes a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

As shown in FIG. 1, the capability indication method may include the following steps.

At step S101, capability indication information is sent to a network side device, where the capability indication information is used to indicate whether the terminal is capable of performing multi-SIM connection switching.

In an embodiment, in case that the terminal is provided with a plurality of SIMs and the plurality of SIMs at least include a first SIM and a second SIM, the multi-SIM connection switching includes switching to the second SIM for communication operation when the communication operation is performed through the first SIM (in this case, the communication operation performed by the first SIM can be interrupted). It should be noted that the multi-SIM connection switching is not limited to the above situation. For example, it may further include enabling the second SIM to perform the communication operation at the same time when the communication operation is performed through the first SIM (in this case, the communication operation performed by the first SIM can be uninterrupted). In the following, the technical solution of the present disclosure will be exemplified mainly for the case that the multi-SIM connection switching includes switching to the second SIM for the communication operation when the communication operation is performed through the first SIM.

In an embodiment, when the terminal uses the first SIM for communication, it may be necessary to use the second SIM for communication. For example, it is necessary to use the second SIM to receive a system message, paging signaling, etc. Therefore, it is necessary to switch to the second SIM for communication operations. However, not all terminals support multi-SIM connection switching.

For example, some terminals can switch to the second SIM for communication operation directly when it is determined that they need to use the corresponding second SIM for communication operation. For example, they can perform multi-SIM connection switching. However, some terminals can't switch to the second SIM for communication operation directly when it is determined that they need to use the corresponding second SIM for communication operation, and these terminals can switch to the corresponding second SIM for communication operation after the communication operation of the corresponding first SIM is completed, that is, they can't perform multi-SIM connection switching.

For terminals with different support conditions for multi-SIM connection switching, configurations made by a base station for SIMs may be different. For example, if the terminal supports multi-SIM connection switching, resources allocated by the base station for the first SIM may be until the terminal switches to the second SIM. For example, if the terminal does not support multi-SIM connection switching, resources allocated by the base station for the first SIM may be until the first SIM completes the communication operation.

According to the embodiments of the present disclosure, the terminal can send the capability indication information to the network side device, so that the network side device can determine whether the terminal is capable of performing multi-SIM connection switching according to the capability indication information. In this way, the network side device, such as a base station, or a core network, can make the appropriate configuration for the terminal.

In an embodiment, sending the capability indication information to the network side device includes: sending the capability indication information to the network side device in a process of establishing a communication connection with the network side device.

The terminal can send the capability indication information to a network side device during the process of establishing the communication connection with the network side device. For example, the network side device is a core network, and the communication connection can be a non-access stratum (NAS) connection; and for example, the network side device is a base station, and the communication connection can be an access stratum (AS) connection.

Taking the network side device as the base station as an example, the access stratum connection may be a radio resource control (RRC) connection, e.g., the terminal may send the capability indication information to the base station during the process of establishing an RRC communication connection with the base station, e.g., in a random access process, a message such as Msg1, Msg3, Msg5, etc., can carry the capability information, and can be sent to the base station.

In an embodiment, the network side device includes an evolved UMTS terrestrial radio access network (E-UTRAN) network side device, and the capability indication information is carried in at least one of: radio resource control connection setup complete (RRCConnectionSetupComplete) signaling; radio resource control connection resume complete (RRCConnectionResumeComplete) signaling; or radio resource control connection reestablishment complete (RRCConnectionReestablishmentComplete) signaling. Taking RRCConnectionSetupComplete signaling as an example, signaling that carries the capability indication information can be as follows:

```
RRCConnectionSetupComplete-v17xx-IEs ::= SEQUENCE {
  muSIMSwitchingAvailable-r17            ENUMERATED {true}
OPTIONAL,
  nonCriticalExtension               SEQUENCE { }
OPTIONAL
  }
```

ENUMERATED {true} indicates that the terminal can perform multi-SIM connection switching.

In an embodiment, the network side device includes a new radio (NR) network side device, and the capability indication information is carried in at least one of: radio resource control setup complete (RRCSetupComplete) signaling; radio resource control resume complete (RRCResumeComplete) signaling; or radio resource control reestablishment complete (RRCReestablishmentComplete) signaling.

Figure 2:
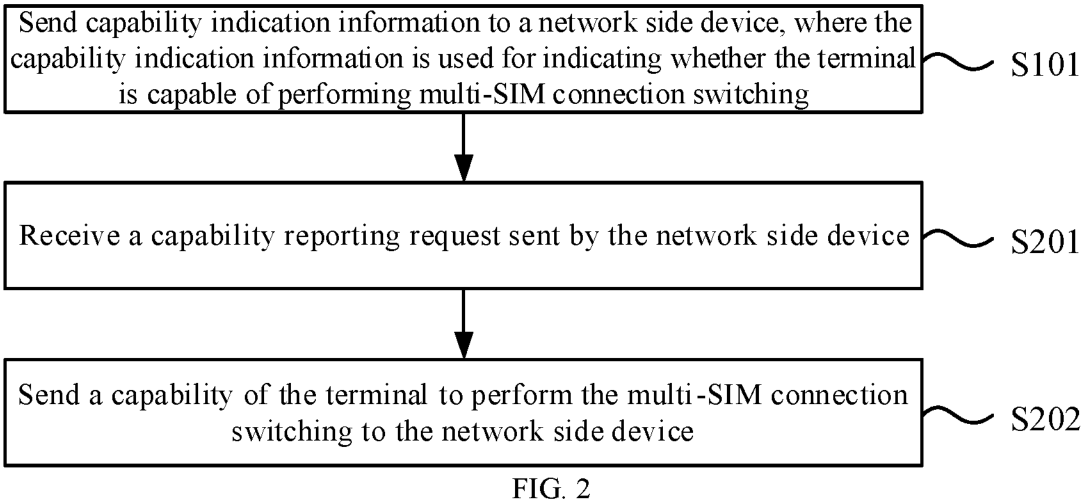
FIG. 2 is a schematic flowchart of another capability indication method illustrated according to an embodiment of the present disclosure.

FIG. 2 is a schematic flowchart of another capability indication method illustrated according to an embodiment of the present disclosure. As shown in FIG. 2, the method further includes the following.

At step S201, a capability reporting request sent by the network side device is received.

At step S202, a capability of the terminal to perform the multi-SIM connection switching is sent to the network side device.

In an embodiment, after receiving the capability indication information sent by the terminal, if the network side device determines that the terminal can perform multi-SIM connection switching, it can send a capability reporting request to the terminal as required to request the terminal to report the capability of performing multi-SIM connection switching to the network side device. After receiving the capability reporting request, the terminal can report the capability of the terminal to perform multi-SIM connection switching to the network side device, so that the network side device can configure the terminal accordingly based on the capability of multi-SIM connection switching.

In an embodiment, after receiving the capability reporting request, the terminal can further determine whether the network side device supports the configuration of multi-SIM connection switching, for example, the terminal determines according to system information broadcast by the network side device. The capability of the terminal to perform the multi-SIM connection switching is reported to the network side device only if the network side device supports the configuration of multi-SIM connection switching, while the capability of the terminal to perform the multi-SIM connection switching may not be reported to the network side device if the network side device does not support the configuration of multi-SIM connection switching, which is conducive to avoiding waste of resources.

In an embodiment, the network side device can carry the capability reporting request in user equipment information request (UEInformationRequest) signaling and send it to the terminal. For example, a new information element (IE) can be added in the UEInformationRequest signaling to carry the capability reporting request.

The newly added IE can be a BOOLEAN IE or an enumeration type IE containing true value.

For example, contents of Boolean IE can be as follows:

```
UEInformationRequest-v17xx-IEs ::= SEQUENCE {
  muSIMSwitchingInfoReq-r17           BOOLEAN
OPTIONAL,
  nonCriticalExtension              SEQUENCE { }
OPTIONAL
  }
```

For example, contents of enumeration type IE containing true value can be as follows:

```
UEInformationRequest-v17xx-IEs ::= SEQUENCE {
  muSIMSwitchingInfoReq-r17         ENUMERATED {true}
OPTIONAL,
  nonCriticalExtension              SEQUENCE { }
OPTIONAL
  }
```

However, in case that the terminal is determined to support multi-SIM connection switching, a specific support capability for multi-SIM connection switching may vary from terminal to terminal, e.g., different terminals may have different specific support situations for multi-SIM connection switching. In addition, specific support situations of different network side devices for multi-SIM connection switching can be different.

In an embodiment, the capability of the terminal to perform multi-SIM connection switching includes whether the terminal is capable of performing the multi-SIM connection switching in case that a first condition is satisfied, where the first condition includes at least one of: the first SIM leaves a connected state; or the first SIM remains in the connected state.

For example, terminal(s) only supports multi-SIM connection switching when the first SIM is not in the connected state, e.g., when the first SIM is used for communication operation, and if it is necessary to switch to the second SIM for communication operation, the first SIM needs to leave the connected state, and the terminal switches to the second SIM for communication operation.

For example, terminal(s) only supports multi-SIM connection switching when the first SIM stays in the connected state, e.g., when the first SIM is used for communication operation, and if it is necessary to switch to the second SIM for communication operation, the first SIM can still be in the connected state, and the terminal may be switched to the second SIM for communication operation.

It can be seen that the specific support situation for multi-SIM connection switching varies from terminal to terminal, and the capability of multi-SIM connection switching varies.

According to this embodiment, the terminal can report the capability of performing multi-SIM connection switching to the network side device, so that the network side device can determine a specific support situation of the terminal for the multi-SIM connection switching accordingly, and then make appropriate configuration for the terminal, which is beneficial to efficient utilization of communication resources.

For example, if the network side device determines, according to the capability information reported by the terminal, that the terminal supports switching to the second SIM for communication operation when the first SIM leaves the connected state and does not support switching to the second SIM for communication operation when the first SIM remains in the connected state, a configuration of the first SIM for communication operation can be determined according to a configuration of the second SIM for communication operation.

For example, it can be determined that time domain resources occupied by the second SIM for communication operation are t1 to t2. When configuring time domain resources for communication operation performed by the first SIM, time domain resources other than t1 to t2 can be configured, so as to prevent the terminal performing communication during switching from the first SIM to the second SIM at a period between t1 and t2, resulting in a waste of resources configured for the first SIM during this period.

For example, if the network side device determines, according to the capability information reported by the terminal, that the terminal supports switching to the second SIM for communication operation when the first SIM remains in the connected state, a context of the first SIM for communication operation can still be retained when it is determined that the terminal uses the second SIM for communication operation, so as to quickly resume communication with the first SIM. It should be understood that it is also possible to delete the context of the first SIM for communication operation to reduce an occupation of a storage space of the network side device.

In an embodiment, the first SIM leaving the connected state includes the first SIM leaving the connected state based on an access stratum; and/or the first SIM leaving the connected state based on the non-access stratum.

The first SIM leaving the connected state can be according to an instruction of access stratum signaling (such as leaving the connected state according to signaling sent by the base station), or it can be leaving the connected state according to signaling sent by the non-access stratum (such as leaving the connected state according to signaling sent by the core network).

In an embodiment, the first SIM remaining in the connected state includes the first SIM remaining in the connected state based on an access stratum; and/or the first SIM remaining in the connected state based on the non-access stratum.

The first SIM remaining in the connected state can be according to an instruction of access stratum signaling (such as remaining in the connected state according to signaling sent by the base station), or it can be remaining in the connected state according to signaling sent by the non-access stratum (such as remaining in the connected state according to signaling sent by a core network).

Figure 3:
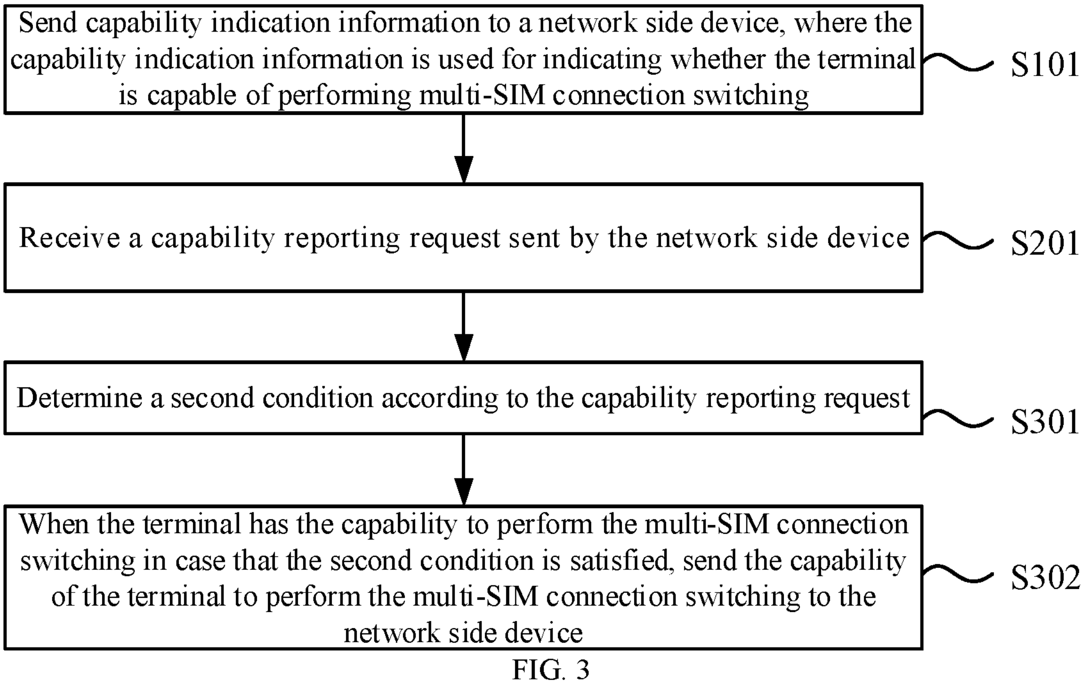
FIG. 3 is a schematic flowchart of yet another capability indication method illustrated according to an embodiment of the present disclosure.

FIG. 3 is a schematic flowchart of yet another capability indication method illustrated according to an embodiment of the present disclosure. As shown in FIG. 3, in an embodiment, sending the capability of the terminal to perform the multi-SIM connection switching to the network side device includes the following.

At step S301, a second condition is determined according to the capability reporting request.

At step S302, when the terminal has the capability to perform the multi-SIM connection switching in case that the second condition is satisfied, the capability of the terminal to perform the multi-SIM connection switching is sent to the network side device.

In an embodiment, the network side can determine a second condition as required, and send a capability report request carrying the second condition to the terminal. When the terminal determines that the second condition exists in the capability reporting request, the terminal may report the capability to the network side device according to the second condition. For example, the terminal may determine whether it can perform multi-SIM connection switching when the second condition is met. In response to the terminal being able to perform the multi-SIM connection switching when the second condition is satisfied, the capability of the terminal to perform the multi-SIM connection switching can be reported to the network side device, and in response to the terminal not being able to perform multi-SIM connection switching when the second condition is satisfied, it is unnecessary to report the capability of the terminal to perform the multi-SIM connection switching to the network side device. Therefore, the network side device can flexibly configure the capability of the terminal to report multi-SIM connection switching, and communication resources are saved.

For example, an IE carrying the second condition in the UEInformationRequest signaling can be as follows:

```
UEInformationRequest-v17xx-IEs ::= SEQUENCE {
  muSIMSwitchingInfoReq-r17 muSIMSwitchingInfo-
                               ReportConfig-r17
OPTIONAL,
  nonCriticalExtension          SEQUENCE { }
OPTIONAL
 }
```

muSIMSwitchingInfoReportConfig-r17 represents the second condition.

In an embodiment, the second condition and the first condition may be partially or completely the same or completely different, and may be set as required. For example, if the network side device supports performing configuration for the terminal when the terminal performs multi-SIM connection switching under the condition of meeting a target condition, the second condition can be set to include the target condition.

For example, the target condition is that the first SIM is remains in the connected state, and the second condition includes the target condition. After the terminal determines the second condition, when the network side device supports performing multi-SIM connection switching in a condition that the first SIM is remains in the connected state, the terminal can send the capability of the terminal to perform the multi-SIM connection switching to the network side device; when the network side device does not support performing multi-SIM connection switching in a condition that the first SIM is remains in the connected state, it is not necessary to send the capability of the terminal to perform the multi-SIM connection switching to the network side device, because even if the capability is reported, the network side device can't properly configure the terminal, thus avoiding wasting communication resources.

Figure 4:
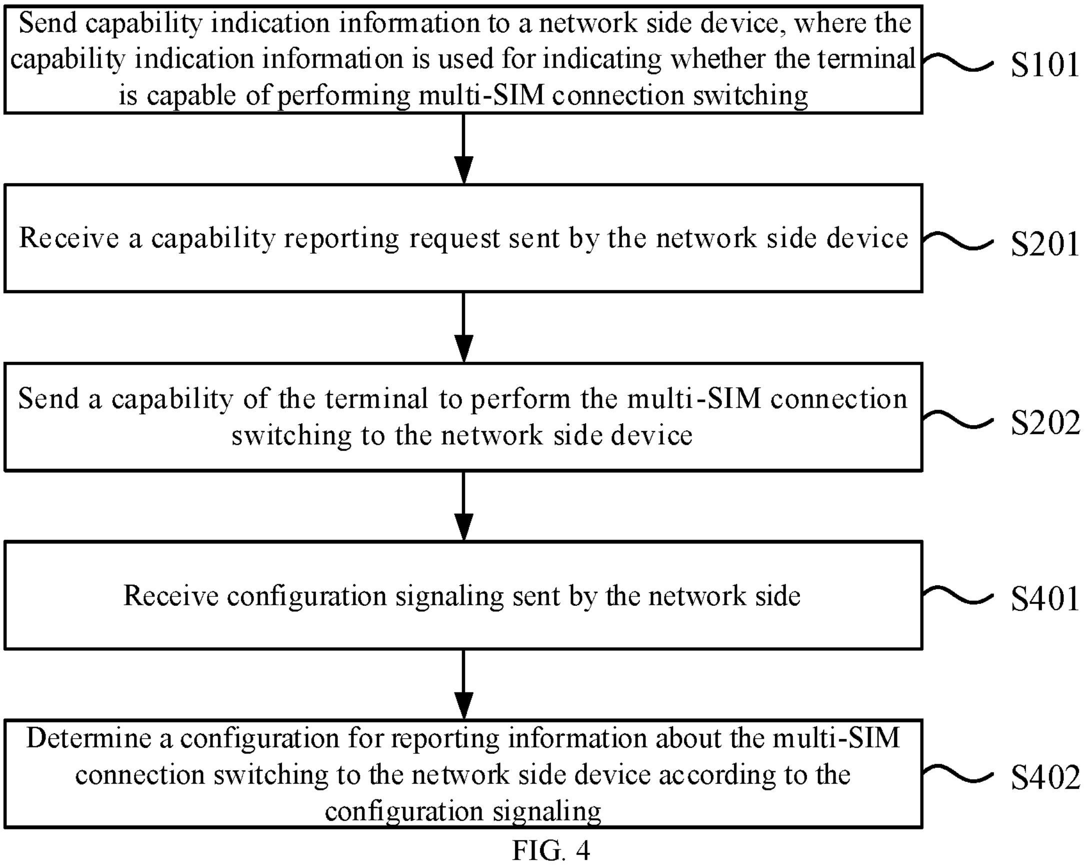
FIG. 4 is a schematic flowchart of yet another capability indication method illustrated according to an embodiment of the present disclosure.

FIG. 4 is a schematic flowchart of yet another capability indication method illustrated according to an embodiment of the present disclosure. As shown in FIG. 4, in an embodiment, the method further includes the following.

At step S401, configuration signaling sent by the network side is received.

At step S402, a configuration for reporting information about the multi-SIM connection switching to the network side device is determined according to the configuration signaling.

In an embodiment, after the terminal reports the capability information to the network side device, the terminal can further report the information about multi-SIM connection switching to the network side device when performing the multi-SIM connection switching. In this case, the network side device can send the configuration signaling to the terminal after receiving the capability information, such as a radio resource control reconfiguration signaling, and the configuration signaling carries a corresponding configuration, which can include time domain resources and/or frequency domain resources. The terminal can report the information about multi-SIM connection switching based on the configuration.

In an embodiment, a configuration indication may be carried in the configuration signaling to indicate sub-signaling used to carry the configuration in the configuration signaling. Taking RRC reconfiguration signaling as an example of the configuration signaling, the configuration can be carried in OtherConfig signaling of the RRC reconfiguration signaling, and the terminal can be informed through the configuration instruction to obtain the configuration in the OtherConfig signaling of RRC reconfiguration signaling.

In an embodiment, the method further includes: reporting the information about the multi-SIM connection to the network side device according to the configuration, which may be reported, for example, via user equipment information response (UEInformationResponse) signaling. The terminal reports the information about the multi-SIM connection switching, which may be reported when the terminal is about to perform the multi-SIM connection switching or during a process of performing the multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about communication operation performed after switching to the second SIM, such as a type of the communication operation performed after switching to the second SIM, a duration of the communication operation, etc.

In an embodiment, the configuration includes at least one of: whether to allow the terminal to report the information about the multi-SIM connection switching; whether to allow the terminal to report information about multi-SIM connection switching satisfying a third condition; a duration of a blocking timer for the terminal to report the information about the multi-SIM connection switching; a fourth condition for the terminal to use the blocking timer to block reporting information about the multi-SIM connection switching; or a support capability of the network side device for the terminal to perform the multi-SIM connection switching.

In an embodiment, the network side device can make various configurations as needed for the terminal to report information about multi-SIM connection switching, and the configuration can instruct the terminal how to report the information about multi-SIM connection switching.

In an embodiment, the method further includes: reporting the information about the multi-SIM connection to the network side device according to the configuration. When the terminal performs multi-SIM connection switching, it can report the information about the multi-SIM connection switching to the network side device according to the configuration of the network side device.

For example, the network side device can configure whether to allow the terminal to report the information about the multi-SIM connection switching. When the terminal determines that it is allowed to report the information about the multi-SIM connection switching according to the configuration, the terminal can report the information about the multi-SIM connection switching. In this case, the configuration can further indicate time domain resources and frequency domain resources for the terminal to report. The terminal does not report the information about the multi-SIM connection switching when the terminal determines that it is not allowed to report the information about the multi-SIM connection switching according to the configuration.

For example, the network side device can configure whether to allow the terminal to report information about multi-SIM connection switching satisfying a third condition, e.g., the network side device can further limit the information about multi-SIM connection switching satisfying the third condition when the network side device configures that the terminal is allowed to report information about the multi-SIM connection switching. For example, the network side device can carry the third condition and an indicator bit in the configuration, where the indicator bit is 1, indicating that the information about multi-SIM connection switching satisfying the third condition is allowed to be reported, and the indicator bit is 0, indicating that the information about multi-SIM connection switching satisfying the third condition is not allowed to be reported.

When the terminal determines that it is allowed to report the information about multi-SIM connection switching satisfying the third condition according to the configuration, the terminal can report the information about multi-SIM connection switching to the network side device when performing the multi-SIM connection switching satisfying the third condition. When the terminal determines that it is not allowed to report the information about multi-SIM connection switching satisfying the third condition according to the configuration, the terminal does not report the information about multi-SIM connection switching to the network side device when performing the multi-SIM connection switching satisfying the third condition, but the terminal can report the information about multi-SIM connection switching to the network side device when performing multi-SIM connection switching satisfying other conditions.

For example, the network side device can configure a duration of a blocking timer for the terminal to report the information about the multi-SIM connection switching, further configure a duration of the blocking timer for the terminal to report the information about the multi-SIM connection switching when the multi-SIM connection switching satisfies the third condition, and may set respective durations of the blocking timers for multi-SIM connection switching that satisfies different conditions, so as to block the reporting. After the terminal determines the duration(s) of the blocking timer(s) according to the configuration, the terminal can start a blocking timer when reporting the information about the multi-SIM connection switching to the network side device, and will not report the information about the multi-SIM connection switching again within a duration of the blocking timer, that is, under the condition that the timer has not timed out.

On this basis, the network side device can further configure a fourth condition for the terminal to use the blocking timer, and the terminal will use the blocking timer only when it is determined that the fourth condition is met, and will not use the blocking timer if the fourth condition is not met. For example, the fourth condition includes a first target type of communication operation performed by the first SIM and a second target type of communication operation performed by the second SIM, etc. Then when the terminal performs multi-SIM connection switching, if a type of communication operation performed by the first SIM is the first target type and/or a type of communication operation performed by the second SIM is the second target type, the blocking timer can be used, otherwise, the blocking timer is not used.

It should be noted that the third condition and the fourth condition can be set as required, which can be the same as the first condition or different from the first condition. For example, the third condition includes at least one of the following: the first SIM leaves a connected state; or the first SIM remains in the connected state. For example, the fourth condition includes at least one of the following: the terminal is performing or will be perform multi-SIM connection switching.

In addition, due to the different performance of network side devices, different network side devices may have different support capabilities for the terminal to perform the multi-SIM connection switching. For example, some network side devices support the terminal in performing the multi-SIM connection switching when the first SIM leaves the connected state, and some network side devices support the terminal in performing the multi-SIM connection switching when the first SIM remains in the connected state. Therefore, the network side device may carry a support capability in the configuration and send it to the terminal, so that the terminal can decide whether or not to report the multi-SIM connection switching information according to the configuration.

For example, if it is determined that the network side device only supports the terminal to perform the multi-SIM connection switching when the first SIM remains in the connected state, the terminal does not need to report the information about multi-SIM connection switching when the first SIM leaves the connected state, so as to avoid wasting communication resources (because even if the information about multi-SIM connection switching is reported in such a case, the network side device cannot make a reasonable configuration for a process of the terminal performing multi-SIM connection switching), and the terminal can report the information about multi-SIM connection switching when the first SIM remains in the connected state for multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about communication operation performed after switching to the second SIM, such as a type of the communication operation performed after switching to the second SIM, a duration of the communication operation, etc.

In an embodiment, after receiving the information about multi-SIM connection switching, the network side device can make an appropriate configuration for the process of multi-SIM connection switching performed by the terminal. For example, the information about multi-SIM connection switching includes a second type of communication operation to be performed when switching to the second SIM. Since a first type of communication operation performed by the first SIM is known to the network side device, the network side device, after determining the second type, can make an appropriate configuration for the process of the terminal performing the multi-SIM connection switching based on the first type and the second type.

For example, if a priority of the first type is higher than a priority of the second type, the network side device can configure the terminal not to switch to the second SIM for communication, and if the priority of the second type is higher than the first type, the network side device can configure the terminal to switch to the second SIM for communication.

The first type and the second type can refer to service types, and the priorities corresponding to the service types can be related to delays allowed by the service types, e.g. the lower the delay allowed, the higher the priority.

In addition to the way of configuring the process of the terminal performing the multi-SIM connection switching mentioned above, other ways can also be considered. For example, delays allowed by the first type and the second type can be considered. For example, if a delay allowed by the first type is relatively large, such as greater than a delay threshold, the network side device can be configured to allow the terminal to switch to the second SIM for communication. For example, if the delay allowed by the first type is relatively small, such as less than the delay threshold, the network side device can be configured not to allow the terminal to switch to the second SIM.

Figure 5:
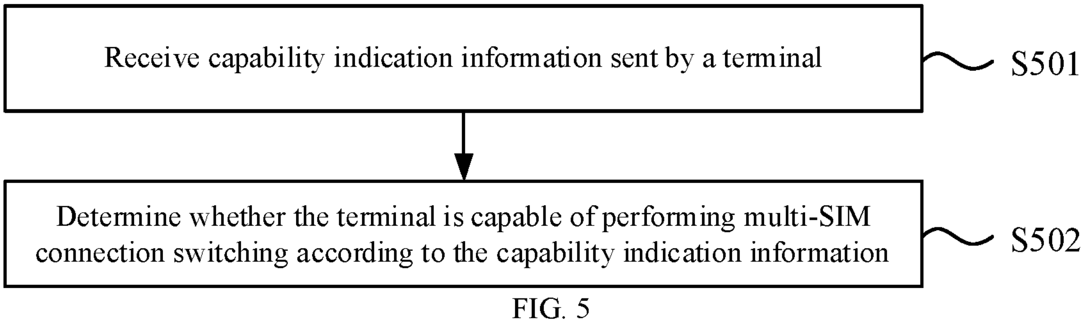
FIG. 5 is a schematic flowchart of a capability determination method illustrated according to an embodiment of the present disclosure.

FIG. 5 is a schematic flowchart of a capability determination method illustrated according to an embodiment of the present disclosure. The capability determination method shown in this embodiment can be performed by a network side device, such as a base station and a core network, the network side device may be in communication with a terminal, the terminal including but not limited to a communication apparatus such as a cell phone, a tablet computer, a wearable device, a sensor, an IoT device, etc., and the network side device includes but is not limited to a network side device in a communication system such as 4G, 5G, 6G, etc.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

As shown in FIG. 5, the capability determination method may include the following steps:

At step S501, capability indication information sent by a terminal is received.

At step S502, it is determined whether the terminal is capable of performing multi-SIM connection switching according to the capability indication information.

In an embodiment, in case that the terminal is provided with a plurality of SIMs, and the plurality of SIMs at least include a first SIM and a second SIM, the multi-SIM connection switching includes switching to the second SIM for communication operation when the communication operation is performed through the first SIM (in this case, the communication operation performed by the first SIM can be interrupted). It should be noted that the multi-SIM connection switching is not limited to the above situation. For example, it may further include enabling the second SIM to perform the communication operation at the same time when the communication operation is performed through the first SIM (in this case, the communication operation performed by the first SIM can be uninterrupted). In the following, the technical solution of the present disclosure will be exemplified mainly for the case that the multi-SIM connection switching includes switching to the second SIM for the communication operation when the communication operation is performed through the first SIM.

In an embodiment, when the terminal uses the first SIM for communication, it may be necessary to use the second SIM for communication. For example, it is necessary to use the second SIM to receive a system message, paging signaling, etc. Therefore, it is necessary to switch to the second SIM for communication operation. But not all terminals support multi-SIM connection switching.

For example, some terminals can switch to the second SIM for communication operation directly when it is determined that they need to use the corresponding second SIM for communication operation. For example, they can perform multi-SIM connection switching. However, some terminals can't switch to the second SIM for communication operation directly when it is determined that they need to use the corresponding second SIM for communication operation, and these terminals can switch to the corresponding second SIM for communication operation after the communication operation of the corresponding first SIM is completed, that is, they can't perform multi-SIM connection switching.

For terminals with different support conditions for multi-SIM connection switching, configurations made by a base station for SIMs may be different. For example, if the terminal supports multi-SIM connection switching, resources allocated by the base station for the first SIM may be until the terminal switches to the second SIM. For example, if the terminal does not support multi-SIM connection switching, resources allocated by the base station for the first SIM may be until the first SIM completes the communication operation.

According to the embodiments of the present disclosure, the terminal can send the capability indication information to the network side device, so that the network side device can determine whether the terminal is capable of performing multi-SIM connection switching according to the capability indication information. In this way, the network side device, such as a base station, or a core network, can make the appropriate configuration for the terminal.

In an embodiment, sending the capability indication information to the network side device includes: sending the capability indication information to the network side device in a process of establishing a communication connection with the network side device.

The terminal can send the capability indication information to a network side device during the process of establishing the communication connection with the network side device. For example, the network side device is a core network, and the communication connection can be a non-access stratum connection; and for example, the network side device is a base station, and the communication connection can be an access stratum connection.

Taking the network side device as the base station as an example, the access stratum connection may be an RRC connection, e.g., the terminal may send the capability indication information to the base station during the process of establishing an RRC communication connection with the base station, e.g., in a random access process, a message such as Msg1, Msg3, Msg5, etc., can carry the capability information, and can be sent to the base station.

Figure 6:
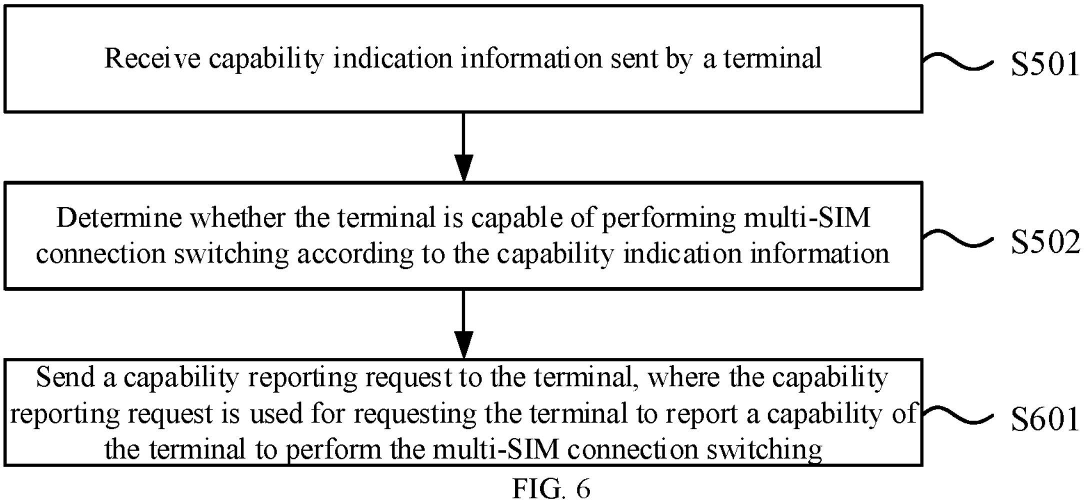
FIG. 6 is a schematic flowchart of another capability determination method illustrated according to an embodiment of the present disclosure.

FIG. 6 is a schematic flowchart of another capability determination method illustrated according to an embodiment of the present disclosure. As shown in FIG. 6, the method further includes: At step S601, a capability reporting request is sent to the terminal, where the capability reporting request is used for requesting the terminal to report a capability of the terminal to perform the multi-SIM connection switching.

In an embodiment, after receiving the capability indication information sent by the terminal, if the network side device determines that the terminal can perform multi-SIM connection switching, it can send a capability reporting request to the terminal as required to request the terminal to report the capability of performing multi-SIM connection switching to the network side device.

In an embodiment, the network side device can carry the capability reporting request in user equipment information request (UEInformationRequest) signaling and send it to the terminal, for example, a new information element (IE) can be added in the UEInformationRequest signaling to carry the capability reporting request.

However, in case that the terminal is determined to support multi-SIM connection switching, a specific support capability for multi-SIM connection switching may vary from terminal to terminal, e.g., different terminals may have different specific support situations for multi-SIM connection switching.

In an embodiment, the capability of the terminal to perform multi-SIM connection switching includes whether the terminal is capable of performing the multi-SIM connection switching in case that a first condition is satisfied, where the first condition includes at least one of: the first SIM leaves a connected state; or the first SIM remains in the connected state.

For example, terminal(s) only supports multi-SIM connection switching when the first SIM is not in the connected state, e.g., when the first SIM is used for communication operation, and if it is necessary to switch to the second SIM for communication operation, the first SIM needs to leave the connected state, and the terminal switches to the second SIM for communication operation.

For example, terminal(s) only supports multi-SIM connection switching when the first SIM stays in the connected state, e.g., when the first SIM is used for communication operation, and if it is necessary to switch to the second SIM for communication operation, the first SIM can still be in the connected state, and the terminal may be switched to the second SIM for communication operation.

It can be seen that the specific support situation for multi-SIM connection switching varies from terminal to terminal, and the capability of multi-SIM connection switching varies.

According to this embodiment, the terminal can report the capability of performing multi-SIM connection switching to the network side device, so that the network side device can determine a specific support situation of the terminal for the multi-SIM connection switching accordingly, and then make appropriate configuration for the terminal, which is beneficial to efficient utilization of communication resources.

For example, if the network side device determines, according to the capability information reported by the terminal, that the terminal supports switching to the second SIM for communication operation when the first SIM leaves the connected state and does not support switching to the second SIM for communication operation when the first SIM remains in the connected state, a configuration of the first SIM for communication operation can be determined according to a configuration of the second SIM for communication operation.

For example, it can be determined that time domain resources occupied by the second SIM for communication operation are t1 to t2. When configuring time domain resources for communication operation performed by the first SIM, time domain resources other than t1 to t2 can be configured, so as to prevent the terminal performing communication during switching from the first SIM to the second SIM at a period between t1 and t2, resulting in a waste of resources configured for the first SIM during this period.

For example, if the network side device determines, according to the capability information reported by the terminal, that the terminal supports switching to the second SIM for communication operation when the first SIM remains in the connected state, a context of the first SIM for communication operation can still be retained when it is determined that the terminal uses the second SIM for communication operation, so as to quickly resume communication with the first SIM. It should be understood that the context of the first SIM for communication operation can further be deleted to reduce an occupation of a storage space of the network side device.

In an embodiment, the capability reporting request carries a second condition, where the second condition is used to indicate that the capability of the terminal to perform the multi-SIM connection switching is reported when the terminal has the capability to perform the multi-SIM connection switching in case that the second condition is satisfied.

In an embodiment, the network side can determine a second condition as required, and send a capability report request carrying the second condition to the terminal. When the terminal determines that the second condition exists in the capability reporting request, the terminal may report the capability to the network side device according to the second condition. For example, the terminal may determine whether it can perform multi-SIM connection switching when the second condition is met. In response to the terminal being able to perform the multi-SIM connection switching when the second condition is satisfied, the capability of the terminal to perform the multi-SIM connection switching can be reported to the network side device, and in response to the terminal not being able to perform multi-SIM connection switching when the second condition is satisfied, it is unnecessary to report the capability of the terminal to perform the multi-SIM connection switching to the network side device. Therefore, the network side device can flexibly configure the capability of the terminal to report multi-SIM connection switching.

In an embodiment, the second condition and the first condition may be partially or completely the same or completely different, and may be set as required. For example, if the network side device supports performing configuration for the terminal when the terminal performs multi-SIM connection switching under the condition of meeting a target condition, the second condition can be set to include the target condition.

For example, the target condition is that the first SIM is remains in the connected state, and the second condition includes the target condition. After the terminal determines the second condition, when the network side device supports performing multi-SIM connection switching in a condition that the first SIM is remains in the connected state, the terminal can send the capability of the terminal to perform the multi-SIM connection switching to the network side device; when the network side device does not support performing multi-SIM connection switching in a condition that the first SIM is remains in the connected state, it is not necessary to send the capability of the terminal to perform the multi-SIM connection switching to the network side device, because even if the capability is reported, the network side device can't properly configure the terminal, thus avoiding wasting communication resources.

Figure 7:
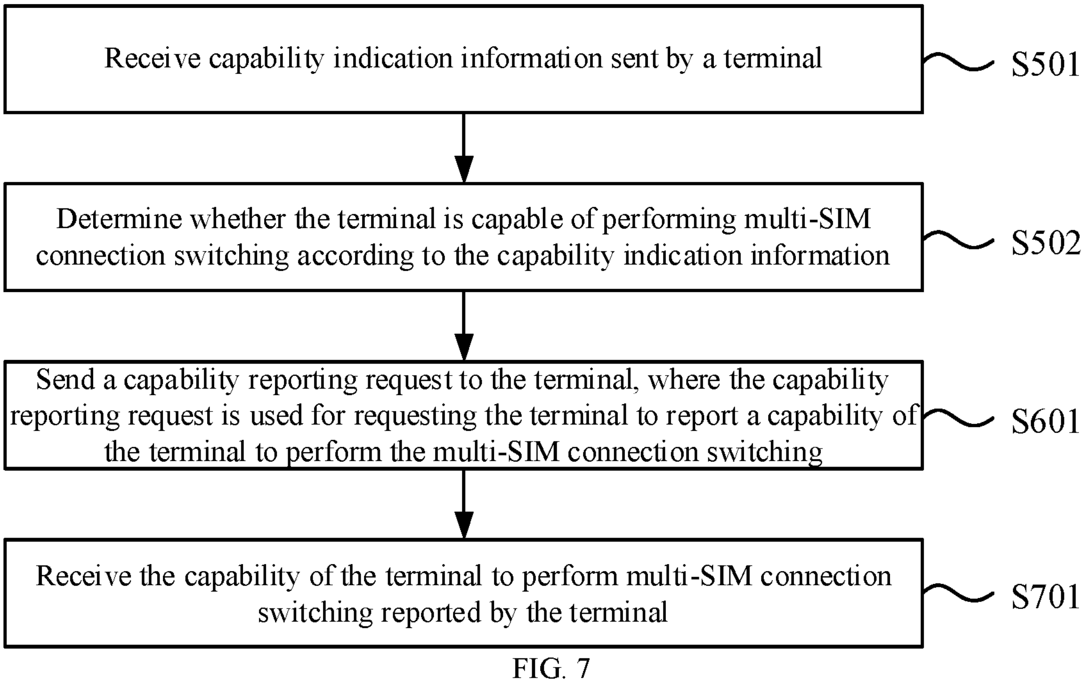
FIG. 7 is a schematic flowchart of yet another capability determination method illustrated according to an embodiment of the present disclosure.

FIG. 7 is a schematic flowchart of yet another capability determination method illustrated according to an embodiment of the present disclosure. As shown in FIG. 7, the method further includes: At step S701, the capability of the terminal to perform multi-SIM connection switching reported by the terminal is received.

In an embodiment, the terminal can report the capability of the terminal to perform multi-SIM connection switching to the network side device, and the network side device can determine the capability of the terminal to perform multi-SIM connection switching accordingly, for example, under what conditions the terminal supports multi-SIM connection switching.

Figure 8:
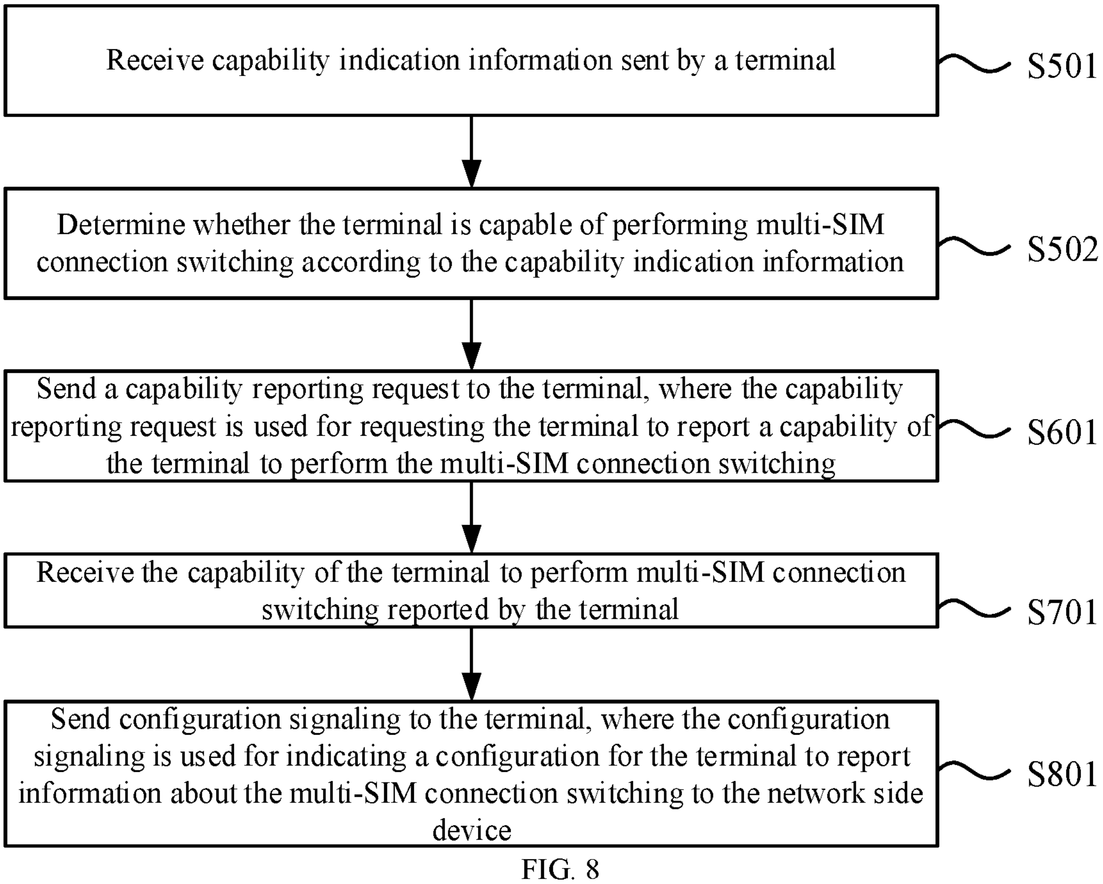
FIG. 8 is a schematic flowchart of yet another capability determination method illustrated according to an embodiment of the present disclosure.

FIG. 8 is a schematic flowchart of yet another capability determination method illustrated according to an embodiment of the present disclosure. As shown in FIG. 8, the method further includes: At step S801, configuration signaling is sent to the terminal, where the configuration signaling is used for indicating a configuration for the terminal to report information about the multi-SIM connection switching to the network side device.

In an embodiment, after the terminal reports the capability information to the network side device, the terminal can further report the information about multi-SIM connection switching to the network side device when performing the multi-SIM connection switching. In this case, the network side device can send the configuration signaling to the terminal after receiving the capability information, such as a radio resource control reconfiguration signaling, and the configuration signaling carries a corresponding configuration, which can include time domain resources and/or frequency domain resources. The terminal can report the information about multi-SIM connection switching based on the configuration.

In an embodiment, a configuration indication may be carried in the configuration signaling to indicate sub-signaling used to carry the configuration in the configuration signaling. Taking RRC reconfiguration signaling as an example of the configuration signaling, the configuration can be carried in OtherConfig signaling of the RRC reconfiguration signaling, and the terminal can be informed through the configuration instruction to obtain the configuration in the OtherConfig signaling of RRC reconfiguration signaling.

In an embodiment, the method further includes: reporting the information about the multi-SIM connection to the network side device according to the configuration, which may be reported, for example, via user equipment information response (UEInformationResponse) signaling. The terminal reports the information about the multi-SIM connection switching, which may be reported when the terminal is about to perform the multi-SIM connection switching or during a process of performing the multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about communication operation performed after switching to the second SIM, such as a type of the communication operation performed after switching to the second SIM, a duration of the communication operation, etc.

Figure 9:
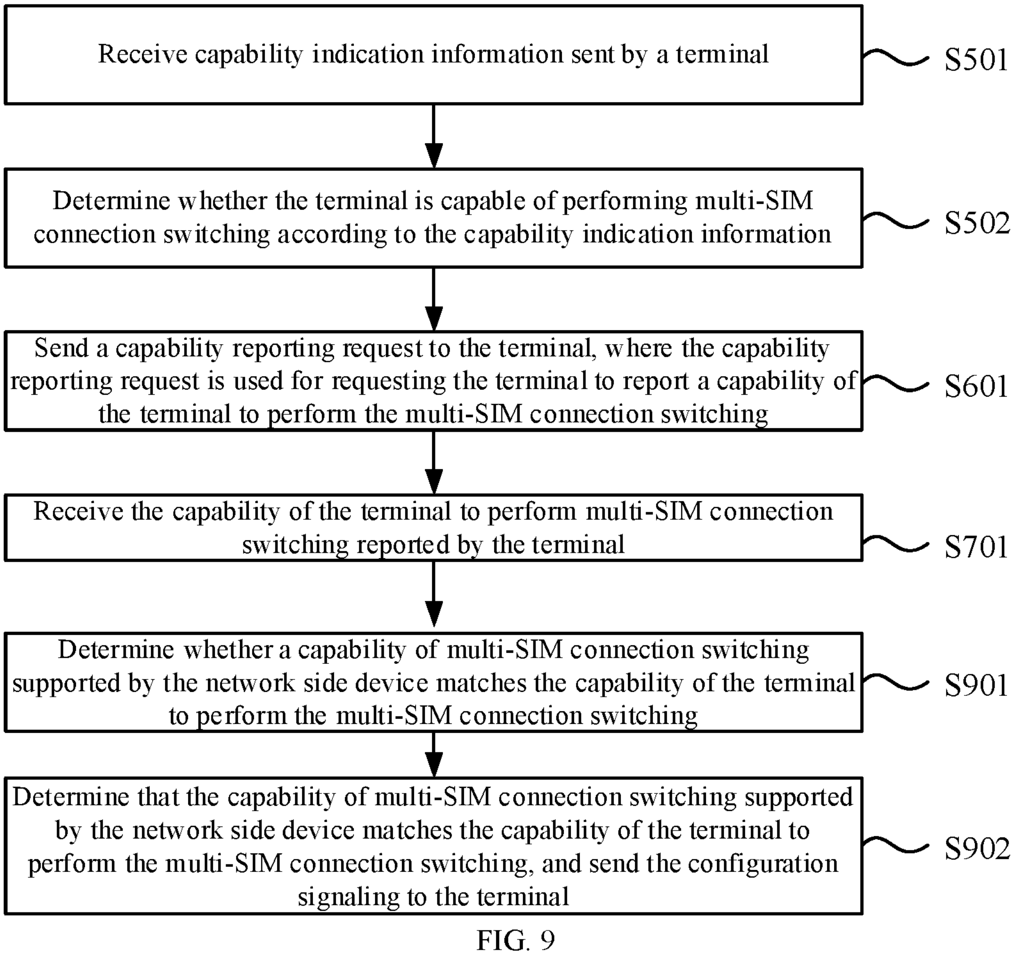
FIG. 9 is a schematic flowchart of yet another capability determination method illustrated according to an embodiment of the present disclosure.

FIG. 9 is a schematic flowchart of yet another capability determination method illustrated according to an embodiment of the present disclosure. As shown in FIG. 9, sending the configuration signaling to the terminal includes: at step S901, it is determined whether a capability of multi-SIM connection switching supported by the network side device matches the capability of the terminal to perform the multi-SIM connection switching.

In an embodiment, the method further includes: at step S902, it is determined that the capability of multi-SIM connection switching supported by the network side device matches the capability of the terminal to perform the multi-SIM connection switching, and the configuration signaling is sent to the terminal.

In an embodiment, the network side device can determine a capability of multi-SIM connection switching supported by itself, for example, it can determine that it supports performing configuration for the terminal when the terminal performs multi-SIM connection switching under the condition of meeting a target condition, and then it can determine whether the capability of multi-SIM connection switching supported by itself matches the capability of the terminal to perform the multi-SIM connection switching.

For example, if the terminal further supports performing multi-SIM connection switching under the condition of meeting the target condition, a match is determined, and if the terminal does not support performing multi-SIM connection switching under the condition of meeting the target condition, a mismatch is determined. In the case of match, the configuration signaling can be sent to the terminal. In the case of mismatch, it is unnecessary to send the configuration signaling to the terminal. In this case, even if the information about the multi-SIM connection switching reported by the terminal is configured, the network side device does not support the configuration of the multi-SIM connection switching performed by the terminal, thereby avoiding wasting communication resources.

In an embodiment, the configuration includes at least one of: whether to allow the terminal to report the information about the multi-SIM connection switching; whether to allow the terminal to report information about multi-SIM connection switching satisfying a third condition; a duration of a blocking timer for the terminal to report the information about the multi-SIM connection switching; a fourth condition for the terminal to use the blocking timer to block reporting information about the multi-SIM connection switching; or a support capability of the network side device for the terminal to perform the multi-SIM connection switching.

In an embodiment, the network side device can make various configurations as needed for the terminal to report information about multi-SIM connection switching, and the configuration can instruct the terminal how to report the information about multi-SIM connection switching.

In an embodiment, the method further includes: reporting the information about the multi-SIM connection to the network side device according to the configuration. When the terminal performs multi-SIM connection switching, it can report the information about the multi-SIM connection switching to the network side device according to the configuration of the network side device.

For example, the network side device can configure whether to allow the terminal to report the information about the multi-SIM connection switching. When the terminal determines that it is allowed to report the information about the multi-SIM connection switching according to the configuration, the terminal can report the information about the multi-SIM connection switching. In this case, the configuration can further indicate time domain resources and frequency domain resources for the terminal to report. The terminal does not report the information about the multi-SIM connection switching when the terminal determines that it is not allowed to report the information about the multi-SIM connection switching according to the configuration.

For example, the network side device can configure whether to allow the terminal to report information about multi-SIM connection switching satisfying a third condition, e.g., the network side device can further limit the information about multi-SIM connection switching satisfying the third condition when the network side device configures that the terminal is allowed to report information about the multi-SIM connection switching. For example, the network side device can carry the third condition and an indicator bit in the configuration, where the indicator bit is 1, indicating that the information about multi-SIM connection switching satisfying the third condition is allowed to be reported, and the indicator bit is 0, indicating that the information about multi-SIM connection switching satisfying the third condition is not allowed to be reported.

When the terminal determines that it is allowed to report the information about multi-SIM connection switching satisfying the third condition according to the configuration, the terminal can report the information about multi-SIM connection switching to the network side device when performing the multi-SIM connection switching satisfying the third condition. When the terminal determines that it is not allowed to report the information about multi-SIM connection switching satisfying the third condition according to the configuration, the terminal does not report the information about multi-SIM connection switching to the network side device when performing the multi-SIM connection switching satisfying the third condition, but the terminal can report the information about multi-SIM connection switching to the network side device when performing multi-SIM connection switching satisfying other conditions.

For example, the network side device can configure a duration of a blocking timer for the terminal to report the information about the multi-SIM connection switching, further configure a duration of the blocking timer for the terminal to report the information about the multi-SIM connection switching when the multi-SIM connection switching satisfies the third condition, and may set respective durations of the blocking timers for multi-SIM connection switching that satisfies different conditions, so as to block the reporting. After the terminal determines the duration(s) of the blocking timer(s) according to the configuration, the terminal can start a blocking timer when reporting the information about the multi-SIM connection switching to the network side device, and will not report the information about the multi-SIM connection switching again within a duration of the blocking timer, that is, under the condition that the timer has not timed out.

On this basis, the network side device can further configure a fourth condition for the terminal to use the blocking timer, and the terminal will use the blocking timer only when it is determined that the fourth condition is met, and will not use the blocking timer if the fourth condition is not met. For example, the fourth condition includes a first target type of communication operation performed by the first SIM and a second target type of communication operation performed by the second SIM, etc. Then when the terminal performs multi-SIM connection switching, if a type of communication operation performed by the first SIM is the first target type and/or a type of communication operation performed by the second SIM is the second target type, the blocking timer can be used, otherwise, the blocking timer is not used.

It should be noted that the third condition and the fourth condition can be set as required, which can be the same as the first condition or different from the first condition. For example, the third condition includes at least one of the following: the first SIM leaves a connected state; or the first SIM remains in the connected state. For example, the fourth condition includes at least one of the following: the terminal is performing or will be perform multi-SIM connection switching.

In addition, due to the different performance of network side devices, different network side devices may have different support capabilities for the terminal to perform the multi-SIM connection switching. For example, some network side devices support the terminal to perform the multi-SIM connection switching when the first SIM leaves the connected state, and some network side devices support the terminal to perform the multi-SIM connection switching when the first SIM remains in the connected state. Therefore, the network side device may carry a support capability in the configuration and send it to the terminal, so that the terminal can decide whether or not to report the multi-SIM connection switching information according to the configuration.

For example, if it is determined that the network side device only supports the terminal to perform the multi-SIM connection switching when the first SIM remains in the connected state, the terminal does not need to report the information about multi-SIM connection switching when the first SIM leaves the connected state, so as to avoid wasting communication resources (because even if the information about multi-SIM connection switching is reported in such a case, the network side device cannot make a reasonable configuration for a process of the terminal performing multi-SIM connection switching), and the terminal can report the information about multi-SIM connection switching when the first SIM remains in the connected state for multi-SIM connection switching.

In an embodiment, the information about the multi-SIM connection switching reported by the terminal includes at least one of the following: information about the second SIM to be switched during a process of the terminal performing multi-SIM connection switching, such as an identification of the second SIM; or information about communication operation performed after switching to the second SIM, such as a type of the communication operation performed after switching to the second SIM, a duration of the communication operation, etc.

In an embodiment, after receiving the information about multi-SIM connection switching, the network side device can make appropriate configuration for the process of multi-SIM connection switching performed by the terminal. For example, the information about multi-SIM connection switching includes a second type of communication operation to be performed when switching to the second SIM. Since a first type of communication operation being performed by the first SIM is known to the network side device, the network side device, after determining the second type, can make an appropriate configuration for the process of the terminal performing the multi-SIM connection switching based on the first type and the second type.

For example, if a priority of the first type is higher than a priority of the second type, the network side device can configure the terminal not to switch to the second SIM for communication, and if the priority of the second type is higher than the first type, the network side device can configure the terminal to switch to the second SIM for communication.

The first type and the second type can refer to service types, and the priorities corresponding to the service types can be related to delays allowed by the service types, e.g. the lower the delay allowed, the higher the priority.

In addition to the way of configuring the process of the terminal performing the multi-SIM connection switching mentioned above, other ways can also be considered. For example, delays allowed by the first type and the second type can be considered. For example, if a delay allowed by the first type is relatively large, such as greater than a delay threshold, the network side device can be configured to allow the terminal to switch to the second SIM for communication. For example, if the delay allowed by the first type is relatively small, such as less than the delay threshold, the network side device can be configured not to allow the terminal to switch to the second SIM.

Corresponding to the foregoing embodiments of the capability indication methods and the capability determination methods, the present disclosure further provides embodiments of capability indication apparatuses and capability determination apparatuses.

An embodiment of the present disclosure further provides a capability indication apparatus. The capability indication apparatus shown in this embodiment can be performed by a terminal, including but not limited to a communication apparatus such as a cell phone, a tablet computer, a wearable device, a sensor, an IoT device, and the like. The terminal can be used as user equipment to communicate with a network side device, including but is not limited to a network side device in a communication system such as 4G, 5G, 6G, etc., and the network side device may be a base station, a core network, and the like.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

In an embodiment, the capability indication apparatus includes one or more processors, and the one or more processors being configured to perform: sending capability indication information to a network side device, where the capability indication information is used for indicating whether a terminal is capable of performing multi-SIM connection switching.

In an embodiment, the multi-SIM connection switching includes switching to the second SIM for communication operation when communication operation is performed through the first SIM.

In an embodiment, the one or more processors is configured to perform: sending the capability indication information to the network side device in a process of establishing a communication connection with the network side device.

In an embodiment, the network side device includes an evolved UMTS terrestrial radio access network (E-UTRAN) network side device, and the capability indication information is carried in at least one of: RRCConnectionSetupComplete signaling; RRCConnectionResumeComplete signaling; or RRCConnectionReestablishmentComplete signaling.

In an embodiment, the network side device includes a new radio (NR) network side device, and the capability indication information is carried in at least one of: RRCSetupComplete signaling; RRCResumeComplete signaling; or RRCReestablishmentComplete signaling.

In an embodiment, the one or more processors are further configured to perform: receiving a capability reporting request sent by the network side device; and sending a capability of the terminal to perform the multi-SIM connection switching to the network side device.

In an embodiment, the capability of the terminal to perform multi-SIM connection switching includes whether the terminal is capable of performing the multi-SIM connection switching in case that a first condition is satisfied, where the first condition includes at least one of: the first SIM leaves a connected state; or the first SIM remains in the connected state.

In an embodiment, the first SIM leaving the connected state includes the first SIM leaving the connected state based on an access stratum; and/or the first SIM leaving the connected state based on the non-access stratum.

In an embodiment, the first SIM remaining in the connected state includes the first SIM remaining in the connected state based on an access stratum; and/or the first SIM remaining in the connected state based on the non-access stratum.

In an embodiment, the one or more processors are configured to perform: determining a second condition according to the capability reporting request; and when the terminal has the capability to perform the multi-SIM connection switching in case that the second condition is satisfied, sending the capability of the terminal to perform the multi-SIM connection switching to the network side device.

In an embodiment, the one or more processors are further configured to perform: receiving configuration signaling sent by the network side; and determining a configuration for reporting information about the multi-SIM connection switching to the network side device according to the configuration signaling.

In an embodiment, the configuration includes at least one of: whether to allow the terminal to report the information about the multi-SIM connection switching; whether to allow the terminal to report information about multi-SIM connection switching satisfying a third condition; a duration of a blocking timer for the terminal to report the information about the multi-SIM connection switching; a fourth condition for the terminal to use the blocking timer to block reporting information about the multi-SIM connection switching; or a support capability of the network side device for the terminal to perform the multi-SIM connection switching.

In an embodiment, the one or more processors are further configured to perform: reporting the information about the multi-SIM connection to the network side device according to the configuration.

An embodiment of the present disclosure further provides a capability determination apparatus. The capability determination apparatus shown in this embodiment can be performed by a network side device, such as a base station and a core network, the network side device may be in communication with a terminal, the terminal including but not limited to a communication apparatus such as a cell phone, a tablet computer, a wearable device, a sensor, an IoT device, etc., and the network side device includes but is not limited to a network side device in a communication system such as 4G, 5G, 6G, etc.

In an embodiment, the terminal may be provided with a plurality of SIMs, either a conventional SIM or an eSIM, i.e., an embedded SIM.

Hereinafter, the technical solution of the present disclosure will be exemplified mainly in case that the plurality of SIMs include a first SIM and a second SIM. The first SIM and the second SIM do not specifically refer to a certain SIM, but are used to represent any two different SIMs among a plurality of SIMs. The first SIM and the second SIM can belong to a same operator or different operators, and can be selected as required.

In an embodiment, the capability determination apparatus includes one or more processors, and the one or more processors being configured to perform: receiving capability indication information sent by a terminal; and determining whether the terminal is capable of performing multi-SIM connection switching according to the capability indication information.

In an embodiment, the multi-SIM connection switching includes switching to the second SIM for communication operation when communication operation is performed through the first SIM.

In an embodiment, the one or more processors are configured to perform: sending a capability reporting request to the terminal, where the capability reporting request is used for requesting the terminal to report a capability of the terminal to perform the multi-SIM connection switching.

In an embodiment, the capability reporting request carries a second condition, where the second condition is used to indicate that the capability of the terminal to perform the multi-SIM connection switching is reported when the terminal has the capability to perform the multi-SIM connection switching in case that the second condition is satisfied.

In an embodiment, the one or more processors are further configured to perform: receiving the capability of the terminal to perform multi-SIM connection switching reported by the terminal.

In an embodiment, the one or more processors are further configured to perform: sending configuration signaling to the terminal, where the configuration signaling is used for indicating a configuration for the terminal to report information about the multi-SIM connection switching to the network side device.

In an embodiment, the one or more processors are configured to perform: determining whether a capability of multi-SIM connection switching supported by the network side device matches the capability of the terminal to perform the multi-SIM connection switching, and if matches, sending the configuration signaling to the terminal.

In an embodiment, the configuration includes at least one of: whether to allow the terminal to report the information about the multi-SIM connection switching; whether to allow the terminal to report information about multi-SIM connection switching satisfying a third condition; a duration of a blocking timer for the terminal to report the information about the multi-SIM connection switching; a fourth condition for the terminal to use the blocking timer to block reporting information about the multi-SIM connection switching; or a support capability of the network side device for the terminal to perform the multi-SIM connection switching.

Regarding the apparatus in the above embodiment, a specific way in which each module performs operations has been described in detail in the embodiment of related methods, and will not be described in detail here.

For the apparatus embodiment, because it basically corresponds to the method embodiment, it is only necessary to refer to the method embodiment for the relevant part of the description. The apparatus embodiments described above are only schematic, where the modules described as separate components may or may not be physically separated, and the components displayed as modules may or may not be physical modules, that is, they may be located in one place or distributed to a plurality of network modules. Some or all of the modules can be selected according to actual needs to achieve the purpose of this embodiment. It can be understood and implemented by a person of ordinary skill in the art without creative labor.

An embodiment of the present disclosure further provides a communication apparatus, including a processor; a memory for storing a computer program; where the capability indication method described in any of the above embodiments is implemented when the computer program is executed by the processor.

An embodiment of the present disclosure further provides a communication apparatus, including: a processor; a memory for storing a computer program; where the capability determination method described in any of the above embodiments is implemented when the computer program is executed by the processor.

An embodiment of the present disclosure further provides a computer-readable storage medium for storing a computer program, which, when executed by a processor, realizes the steps in the capability indication method described in any of the above embodiments.

An embodiment of the present disclosure further provides a computer-readable storage medium for storing a computer program, which, when executed by a processor, realizes the steps in the capability determination method described in any of the above embodiments.

Figure 10:
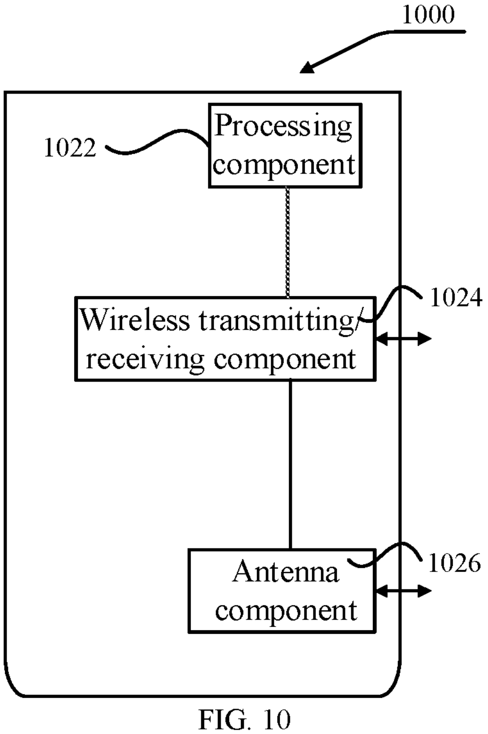
FIG. 10 is a schematic block diagram of an apparatus for capability determination illustrated according to an embodiment of the present disclosure.

As shown in FIG. 10, FIG. 10 is a schematic block diagram of an apparatus 1000 for capability determination illustrated according to an embodiment of the present disclosure. The apparatus 1000 may be provided as a base station. Referring to FIG. 10, the apparatus 1000 includes a processing component 1022, a wireless transmitting/receiving component 1024, an antenna component 1026, and a signal processing part unique to a wireless interface, and the processing component 1022 may further include one or more processors. One of the processors in the processing component 1022 may be configured to implement the capability determination method described in any of the above embodiments.

Figure 11:
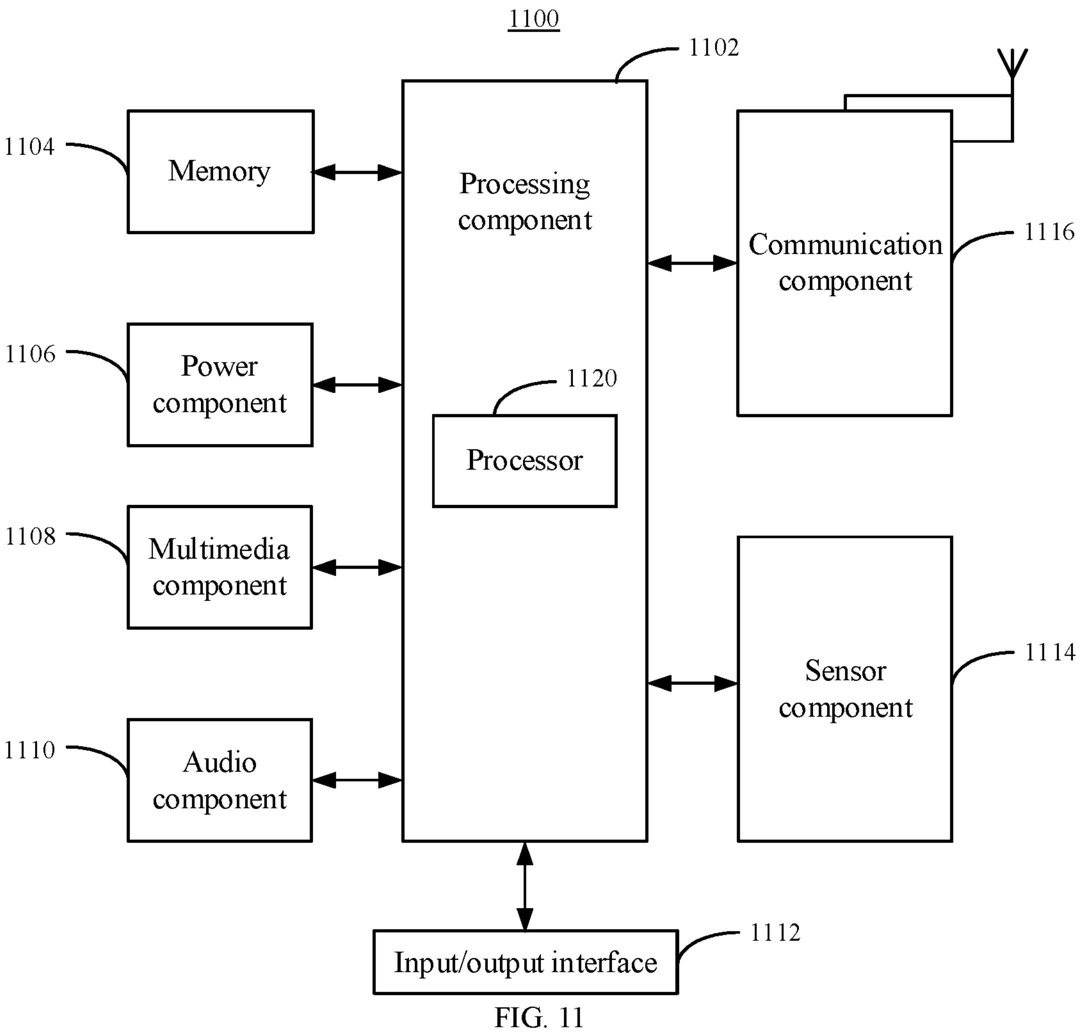
FIG. 11 is a schematic block diagram of an apparatus for capability indication illustrated according to an embodiment of the present disclosure.

FIG. 11 is a schematic block diagram of an apparatus 1100 for capability indication illustrated according to an embodiment of the present disclosure. For example, the apparatus 1100 may be a mobile phone, a computer, a digital broadcasting terminal, a messaging device, a game console, a tablet device, a medical device, a fitness device, a personal digital assistant, etc.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 generally controls the overall operation of the apparatus 1100, such as operations associated with display, telephone call, data communication, camera operation and recording operation. The processing component 1102 may include one or more processors 1120 to execute instructions to complete all or part of steps of the capability indication method. In addition, the processing component 1102 may include one or more modules to facilitate interactions between the processing component 1102 and other components. For example, the processing component 1102 may include a multimedia module to facilitate interactions between the multimedia component 1108 and the processing component 1102.

The memory 1104 is configured to store various types of data to support operations in the apparatus 1100. Examples of these data include instructions of any application program or method for being operated on the apparatus 1100, contact data, phone book data, messages, pictures, videos, etc. The memory 1104 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 1106 provides power to various components of the apparatus 1100. The power component 1106 may include a power management system, one or more power supplies, and other components associated with generating, managing and distributing power for the apparatus 1100.

The multimedia component 1108 includes a screen that provides an output interface between the apparatus 1100 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touching or sliding action, but also detect a duration and a pressure related to the touching or sliding operation. In some embodiments, the multimedia component 1108 includes a front camera and/or a rear camera. When the apparatus 1100 is in an operation mode, such as a shooting mode or a video mode, the front camera and/or the rear camera can receive external multimedia data. Each front camera and rear camera may be a fixed optical lens system or have focal length and optical zoom capability.

The audio component 1110 is configured to output and/or input audio signals. For example, the audio component 1110 includes a microphone (MIC) configured to receive external audio signals when the apparatus 1100 is in the operation mode, such as a calling mode, a recording mode and a voice recognition mode. The received audio signal may be further stored in the memory 1104 or transmitted via the communication component 1116. In some embodiments, the audio component 1110 further includes a speaker for outputting audio signals.

The I/O interface 1112 provides an interface between the processing component 1102 and peripheral interface modules, where the peripheral interface modules may be keyboards, click-wheels, buttons, etc. These buttons may include, but are not limited to: home button, volume button, start button, and lock button.

The sensor component 1114 includes one or more sensors for providing various aspects of state evaluation for the apparatus 1100. For example, the sensor component 1114 can detect an on/off state of the apparatus 1100, a relative positioning of components, for example, the components are the display and the keypad of the apparatus 1100, and the sensor component 1114 can also detect a position change of the apparatus 1100 or a component of the apparatus 1100, presence or absence of user contact with the apparatus 1100, orientation or acceleration/deceleration of the apparatus 1100 and a temperature change of the apparatus 1100. The sensor component 1114 may include a proximity sensor configured to detect the presence of a nearby object without any physical contact. The sensor component 1114 may also include an optical sensor, such as a CMOS or CCD image sensor, for use in imaging applications. In some embodiments, the sensor component 1114 may further include an acceleration sensor, a gyroscope sensor, a magnetic sensor, a pressure sensor, or a temperature sensor.

The communication component 1116 is configured to facilitate wired or wireless communication between the apparatus 1100 and other devices. The apparatus 1100 can access a wireless network based on communication standards, such as WiFi, 2G or 3G, 4G LTE, 5G NR or combinations thereof. In an embodiment, the communication component 1116 receives a broadcast signal or broadcast related information from an external broadcast management system via a broadcast channel. In an embodiment, the communication component 1116 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 1100 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors or other electronic components, for executing the capability indication method.

In an embodiment, a non-transitory computer-readable storage medium is further provided, such as the memory 1104 including instructions, where the instructions can be executed by a processor 1120 of the apparatus 1100 to complete the capability indication method. For example, the non-transitory computer-readable storage medium may be an ROM, a random access memory (RAM), a CD-ROM, a magnetic tape, a floppy disk, an optical data storage device, etc.

Other embodiments of the present disclosure will easily occur to those skilled in the art after considering the specification and practicing the disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as exemplary only, and true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

It should be noted that, relational terms here such as first and second are only used to distinguish one entity or operation from another entity or operation, and do not necessarily require or imply that there is any such actual relationship or order between these entities or operations. Terms "including", "containing" or any other variations thereof are intended to cover non-exclusive inclusion, so that a process, method, object or device including a series of elements not only includes those elements, but also includes other elements not explicitly listed or elements inherent to such process, method, object or device. Without further limitations, an element defined by the phrase "including one" does not exclude the existence of other identical elements in the process, method, object or device including the element.

The methods and apparatuses of the present disclosure are described above in detail. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A capability indication method, performed by a terminal, comprising:

sending capability indication information to a network side device, wherein the capability indication information is used for indicating whether the terminal is capable of performing multiple subscriber identity module (multi-SIM) connection switching;

wherein the method further comprises:

receiving configuration signaling sent by the network side device;

determining, according to the configuration signaling, a configuration for reporting information about the multi-SIM connection switching to the network side device; and during a process of performing the multi-SIM connection switching, reporting the information about the multi-SIM connection switching to the network side device according to the configuration, wherein the reported information about the multi-SIM connection switching comprises a second type of communication operation to be performed when switching to a second SIM, so that the network side device makes a configuration for a process of the terminal performing the multi-SIM connection switching based on a first type of communication operation being performed by a first SIM and the second type.

2. The capability indication method according to claim 1, wherein the terminal is provided with a plurality of SIMs, and the plurality of SIMs at least comprise a first SIM and the second SIM, and the multi-SIM connection switching comprises switching to the second SIM for communication operation when communication operation is performed through the first SIM.

3. The capability indication method according to claim 1, wherein sending the capability indication information to the network side device comprises:

sending the capability indication information to the network side device in a process of establishing a communication connection with the network side device.

4. The capability indication method according to claim 3, wherein the network side device comprises an evolved UMTS terrestrial radio access network (E-UTRAN) network side device, and the capability indication information is carried in at least one of:

RRCConnectionSetup Complete signaling;

RRCConnectionResumeComplete signaling; or

RRCConnectionReestablishmentComplete signaling.

5. The capability indication method according to claim 3, wherein the network side device comprises a new radio (NR) network side device, and the capability indication information is carried in at least one of:

RRCSetupComplete signaling;

RRCResumeComplete signaling; or

RRCReestablishmentComplete signaling.

6. The capability indication method according to claim 2, further comprising:

receiving a capability reporting request sent by the network side device; and sending a capability of the terminal to perform the multi-SIM connection switching to the network side device.

7. The capability indication method according to claim 6, wherein the capability of the terminal to perform multi-SIM connection switching comprises whether the terminal is capable of performing the multi-SIM connection switching in case that a first condition is satisfied, wherein the first condition comprises at least one of:

the first SIM leaves a connected state; or the first SIM remains in the connected state;

wherein the first SIM leaves the connected state comprises at least one of:

the first SIM leaves the connected state based on an access stratum; or the first SIM leaves the connected state based on a non-access stratum;

wherein the first SIM remains in the connected state comprises at least one of:

the first SIM remains in the connected state based on an access stratum; or the first SIM remains in the connected state based on a non-access stratum.

8. The capability indication method according to claim 6, wherein sending the capability of the terminal to perform the multi-SIM connection switching to the network side device comprises:

determining a second condition according to the capability reporting request; and when the terminal has the capability to perform the multi-SIM connection switching in case that the second condition is satisfied, sending the capability of the terminal to perform the multi-SIM connection switching to the network side device.

9. The capability indication method according to claim 1, wherein the configuration comprises at least one of:

whether to allow the terminal to report the information about the multi-SIM connection switching;

whether to allow the terminal to report information about multi-SIM connection switching satisfying a third condition;

a duration of a blocking timer for the terminal to report the information about the multi-SIM connection switching;

a fourth condition for the terminal to use the blocking timer to block reporting information about the multi-SIM connection switching; or a support capability of the network side device for the terminal to perform the multi-SIM connection switching.

10. A capability determination method, performed by a network side device, comprising:

receiving capability indication information sent by a terminal; and determining whether the terminal is capable of performing multiple subscriber identity module (multi-SIM) connection switching according to the capability indication information;

wherein the method further comprises:

sending configuration signaling to the terminal, wherein the configuration signaling is used for indicating a configuration for the terminal to report information about the multi-SIM connection switching to the network side device;

receiving the information about the multi-SIM connection switching reported by the terminal according to the configuration during a process of performing the multi-SIM connection switching, wherein the reported information about the multi-SIM connection switching comprises a second type of communication operation to be performed when switching to a second SIM; and makes a configuration for a process of the terminal performing the multi-SIM connection switching based on a first type of communication operation being performed by a first SIM and the second type.

11. The capability determination method according to claim 10, wherein the terminal is provided with a plurality of SIMs, and the plurality of SIMs at least comprise a first SIM and the second SIM, and the multi-SIM connection switching comprises switching to the second SIM for communication operation when communication operation is performed through the first SIM.

12. The capability determination method according to claim 10, further comprising:

sending a capability reporting request to the terminal, wherein the capability reporting request is used for requesting the terminal to report a capability of the terminal to perform the multi-SIM connection switching, and the capability reporting request carries a second condition, wherein the second condition is used to indicate that the capability of the terminal to perform the multi-SIM connection switching is reported when the terminal has the capability to perform the multi-SIM connection switching in case that the second condition is satisfied.

13. The capability determination method according to claim 12, further comprising:

receiving the capability of the terminal to perform multi-SIM connection switching reported by the terminal.

14. The capability determination method according to claim 10, wherein sending the configuration signaling to the terminal comprises:

determining whether a capability of multi-SIM connection switching supported by the network side device matches the capability of the terminal to perform the multi-SIM connection switching; and determining that the capability of multi-SIM connection switching supported by the network side device matches the capability of the terminal to perform the multi-SIM connection switching, and sending the configuration signaling to the terminal.

15. The capability determination method according to claim 10, wherein the configuration comprises at least one of:

whether to allow the terminal to report the information about the multi-SIM connection switching;

whether to allow the terminal to report information about multi-SIM connection switching satisfying a third condition;

a duration of a blocking timer for the terminal to report the information about the multi-SIM connection switching;

a fourth condition for the terminal to use the blocking timer to block reporting information about the multi-SIM connection switching; or a support capability of the network side device for the terminal to perform the multi-SIM connection switching.

16. A capability determination apparatus, comprising:

one or more processors, wherein the one or more processors are collectively configured to perform the capability determination method according to claim 10.

17. A capability indication apparatus, comprising:

one or more processors, wherein the one or more processors are collectively configured to:

send capability indication information to a network side device, wherein the capability indication information is used for indicating whether a terminal is capable of performing multiple subscriber identity module (multi-SIM) connection switching;

wherein the one or more processors are collectively configured to:

receive configuration signaling sent by the network side device;

determine, according to the configuration signaling, a configuration for reporting information about the multi-SIM connection switching to the network side device; and during a process of performing the multi-SIM connection switching, report the information about the multi-SIM connection switching to the network side device according to the configuration, wherein the reported information about the multi-SIM connection switching comprises a second type of communication operation to be performed when switching to a second SIM, so that the network side device makes a configuration for a process of the terminal performing the multi-SIM connection switching based on a first type of communication operation being performed by a first SIM and the second type.

* * * * *